United States Patent
Xie

(10) Patent No.: US 12,430,719 B2
(45) Date of Patent: Sep. 30, 2025

(54) METHOD AND APPARATUS FOR GENERATING SUPER NIGHT SCENE IMAGE, AND ELECTRONIC DEVICE AND STORAGE MEDIUM

(71) Applicant: ARASHI VISION INC., Shenzhen (CN)

(72) Inventor: Liang Xie, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 343 days.

(21) Appl. No.: 17/790,989

(22) PCT Filed: Jan. 5, 2021

(86) PCT No.: PCT/CN2021/070225
§ 371 (c)(1),
(2) Date: Jul. 6, 2022

(87) PCT Pub. No.: WO2021/139635
PCT Pub. Date: Jul. 15, 2021

(65) Prior Publication Data
US 2023/0074180 A1    Mar. 9, 2023

(30) Foreign Application Priority Data

Jan. 7, 2020 (CN) .......................... 202010014410.7

(51) Int. Cl.
G06T 5/70 (2024.01)
G06T 5/50 (2006.01)
G06T 7/30 (2017.01)

(52) U.S. Cl.
CPC .............. G06T 5/70 (2024.01); G06T 5/50 (2013.01); G06T 7/30 (2017.01);
(Continued)

(58) Field of Classification Search
CPC .. G06T 5/002; G06T 5/50; G06T 7/30; G06T 2207/20221; G06T 2207/20052; G06T 2207/20192
See application file for complete search history.

(56) References Cited

U.S. PATENT DOCUMENTS 5,828,793 A * 10/1998 Mann ...................... G06T 5/40
358/448
2005/0008259 A1 * 1/2005 Kondo ................. H04N 19/527
375/E7.19
(Continued)

FOREIGN PATENT DOCUMENTS

CN    107809582 A    3/2018
CN    109767413 A    5/2019
(Continued)

OTHER PUBLICATIONS

CN110611750 Wang et al, Google translated (Year: 2019).*

Primary Examiner — Jianxun Yang
(74) Attorney, Agent, or Firm — XSENSUS LLP

(57) ABSTRACT

The present disclosure discloses a method, device, electronic equipment and storage medium for generating a super night scene image. The method includes the following steps: acquiring consecutive multiple frames of original images, which include a frame of underexposed image and multiple frames of normally exposed images; performing stacked noise reduction processing on the multiple frames of normally exposed images to obtain a frame of normally noise-reduced image; performing gray scale transformation processing on the normally noise-reduced image to obtain a frame of overexposed image; fusing the underexposed image, the normally noise-reduced image and the overexposed image to obtain a frame of super night scene image.

18 Claims, 3 Drawing Sheets

(52) U.S. Cl.
CPC .............. *G06T 2207/20052* (2013.01); *G06T 2207/20192* (2013.01); *G06T 2207/20221* (2013.01)

(56) References Cited

U.S. PATENT DOCUMENTS

2011/0084966 A1* 4/2011 Kao .................... G09G 3/3611
345/426
2012/0133797 A1   5/2012 Sato et al.

FOREIGN PATENT DOCUMENTS

| | | |
|---|---|---|
| CN | 110166709 A | 8/2019 |
| CN | 110225330 A | 9/2019 |
| CN | 110611750 A | 12/2019 |
| JP | 2012253725 A | 12/2012 |

* cited by examiner

METHOD AND APPARATUS FOR GENERATING SUPER NIGHT SCENE IMAGE, AND ELECTRONIC DEVICE AND STORAGE MEDIUM

CROSS-REFERENCE TO RELATED APPLICATIONS

This application is a continuation of International Application No. PCT/CN2021/070225, with an international filing date of Jan. 5, 2021, which is based upon and claims priority to Chinese Patent Application No. 202010014410.7, filed with the Chinese Patent Office on Jan. 7, 2020, titled "METHOD AND APPARATUS FOR GENERATING SUPER NIGHT SCENE IMAGE, AND ELECTRONIC DEVICE AND STORAGE MEDIUM", the entire contents of which are incorporated herein by reference.

TECHNICAL FIELD

The present disclosure relates to the technical field of image processing, and in particular, relates to a method, device, electronic equipment and storage medium for generating a super night scene image.

BACKGROUND

Traditional night scene enhancement photo processing generally uses an image brightness algorithm or a contrast enhancement algorithm for enhancement processing of a night scene image after the image is captured, so as to improve the brightness and contrast of the dark part of the image. However, because the night scene image has a lot of noise, and the noise may be enhanced, the enhancement effect of the whole night scene image is not good. At the same time, if the enhancement coefficient is determined according to local variance, then halo is likely to occur at the place with excessive intensity of light and shade.

SUMMARY

In one aspect, the present disclosure discloses a method for generating a super night scene image, and the method includes the following steps:
  acquiring consecutive multiple frames of original images, which include a frame of underexposed image and multiple frames of normally exposed images;
  performing stacked noise reduction processing on the multiple frames of normally exposed images to obtain a frame of normally noise-reduced image;
  performing gray scale transformation processing on the normally noise-reduced image to obtain a frame of overexposed image;
  fusing the underexposed image, the normally noise-reduced image and the overexposed image to obtain a frame of super night scene image.

In another aspect, the present disclosure discloses an electronic equipment, which includes a memory, a processor, and a computer program stored in the memory and executable on the processor, and the computer program, when executed by the processor, enables the processor to execute the steps of the method as described above.

In another aspect, the present disclosure discloses a computer-readable storage medium storing a computer program, and the computer program, when executed by a processor, executes the steps of the method as described above.

BRIEF DESCRIPTION OF THE DRAWINGS

For clearer descriptions of technical solutions according to the embodiments of the present disclosure, drawings that are to be referred for description of the embodiments are briefly described hereinafter. Apparently, the drawings described hereinafter merely illustrate some embodiments of the present disclosure. Persons of ordinary skill in the art may also derive other drawings based on the drawings described herein without any creative effort.

DETAILED DESCRIPTION

In order to make objectives, technical solutions and advantages of the present disclosure clearer, the present disclosure will be further described in detail with reference to attached drawings and embodiments. It shall be appreciated that, the specific embodiments described herein are only used for explaining the present disclosure, and are not intended to limit the present disclosure.

Hereinafter, the specific implementation of the present disclosure will be described in detail with reference to the specific embodiments.

FIRST EMBODIMENT

Figure 1:
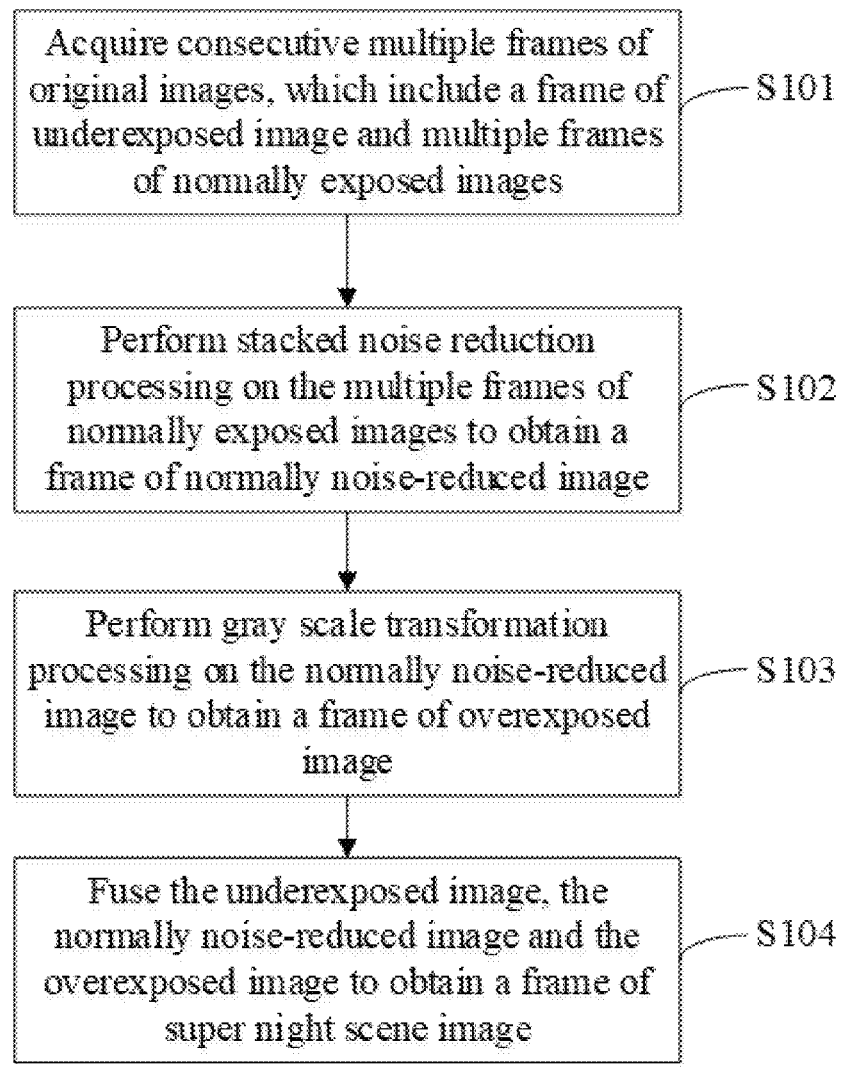
FIG. 1 is a flowchart diagram for implementing a method for generating a super night scene image according to an embodiment of the present disclosure.

FIG. 1 shows a flowchart diagram for implementing a method for generating a super night scene image according to an embodiment of the present disclosure. For convenience of description, only parts related to the embodiment of the present disclosure are shown, and the details are as follows.

In step S101, consecutive multiple frames of original images are acquired, and the consecutive multiple frames of original images include a frame of underexposed image and multiple frames of normally exposed images.

Embodiments of the present disclosure are applicable to electronic equipments, which may include mobile phones, watches, tablets, computers, cameras and other equipments with the photographing function. In embodiments of the present disclosure, multiple frames of original images continuously captured by an electronic equipment in a dark place, the dark place is at night or other scenes with dark light, are acquired. For convenience of explanation, in this example, the number of frames of the original images is represented by M, M>3, and the multiple frames of original images should include a frame of underexposed image and multiple frames of normally exposed images. In practice, for the convenience of operation, usually the underexposed image is the first frame of image acquired. For example, if there are 9 frames of original images captured continuously, then the first frame of image is the underexposed image, and the last 8 frames of images are the normally exposed images.

In step S102, stacked noise reduction processing is performed on the multiple frames of normally exposed images to obtain a frame of normally noise-reduced image.

In embodiments of the present disclosure, the step of performing stacked noise reduction processing on the multiple frames of normally exposed images to obtain a frame of normally noise-reduced image includes:

S1021: performing weighted fusion noise reduction processing on the multiple frames of normally exposed images to obtain a frame of stacked noise-reduced image.

In some embodiments, a frame of image is selected from the multiple frames of normally exposed images as a reference image, the images other than the reference image in the multiple frames of normally exposed images are aligned with the reference image, and weighted fusion noise reduction processing is performed on the multiple frames of normally exposed images that are aligned to obtain the stacked noise-reduced image, thereby reducing the adverse effect caused by the misalignment of the images. Wherein the first frame of image in the normally exposed images is selected as the reference image, or the second frame of image in the normally exposed images is selected as the reference image, or the last frame of image in the normally exposed images is selected as the reference image, and no limitation is made thereto. The alignment of a certain frame of image with other frames of images relates to the prior art, e.g., the alignment is performed by sparse optical flow. Therefore, in the alignment of the images other than the reference image in the multiple frames of normally exposed images with the reference image, the alignment is performed by the image alignment methods of the prior art, this will not be further described herein.

Optionally, weighted fusion noise reduction processing is performed on the multiple frames of normally exposed images that are aligned according to a first formula to obtain the stacked noise-reduced image;

wherein the first formula is:

$$\overline{I}(x, y) = \frac{\sum_{M-1}^{I} w_i(x, y) I_i(x, y)}{\sum_{M-1}^{I} w_i(x, y)},$$

$\overline{I}(x,y)$ represents the stacked noise-reduced image, $I_i(x,y)$ represents the i-th image among the multiple frames of normally exposed images that are aligned, M−1 represents the number of frames of the normally exposed images, $w_j(x,y)$ represents a weight of the weighted fusion, the weight of the weighted fusion is determined by the difference between the current image and the reference image, and the larger the difference is, the smaller the weight will be. The weight $w_i(x,y)$ is calculated by the following formula:

$$w_i(x, y) = \begin{cases} 1 & d(x, y) <= n \\ \max\left(\frac{3n - d(x, y)}{2n}, 0\right) & d(x, y) > n \end{cases},$$

$$d(x, y) = |I_i(x, y) - I_0(x, y)|,$$

wherein $I_0(x,y)$ represents the reference image, $d(x,y)$ represents the brightness difference value between the i-th image $I_i(x,y)$ among the M−1 frames of normally exposed images that are aligned and the reference image $I_0(x,y)$, and n represents an intensity value of a preset image noise. The noise intensity n is determined by ISO, exposure time of the electronic equipment, and the properties of the sensor itself. For the same sensor, ISO represents the photosensitive speed of a CCD or CMOS photosensitive element, the larger the ISO is, the larger the n will be, and the shorter the exposure time is, the larger the n will be.

In some embodiments, weighted fusion noise reduction processing is performed on the multiple frames of normally exposed images that are aligned in an RGB space according to the first formula. Optionally, weighted fusion noise reduction processing is performed on the multiple frames of normally exposed images that are aligned in the YUV space according to the first formula. Optionally, the Y component data of the multiple frames of normally exposed images that are aligned as well as the U component data and V component data of the reference image are acquired, weighted fusion noise reduction processing is performed on the Y component data according to the first formula, and edge-preserving filtering processing is performed on the U component data and the V component data. The Y component data after the weighted fusion noise reduction processing and the U component data and the V component data after the edge-preserving filtering processing are combined to obtain the stacked noise-reduced image, thereby improving the calculation speed in the weighted fusion noise reduction process. The edge-preserving filtering processing is bilateral filtering processing or directional filtering processing, and no limitation is made thereto. The stacked noise-reduced image is an image stored in the YUV space, or an image converted to the RGB space or other color spaces, and no limitation is made thereto.

S1022: generating a normally noise-reduced image from the stacked noise-reduced image by a single-frame image noise reduction method.

In some embodiments, generating a normally noise-reduced image from the stacked noise-reduced image by a single-frame image noise reduction method, which further decreases the influence of noise. The single-frame image noise reduction method is performed in a discrete cosine space. When discrete cosine transform is used for noise reduction, one pixel is slid each time. For convenience of description, the corresponding pixel point after each sliding is called a target pixel point in some embodiments. Optionally, several reference pixel points are randomly selected in a neighboring window of a target pixel point, the target pixel point and each of the reference pixel points are respectively taken as centers to obtain pixel blocks; DCT (Discrete Cosine Transform) transform is performed on each of the pixel blocks, and a DCT coefficient corresponding to each of the pixel blocks is updated according to a preset threshold, DCT inverse transform is performed on the updated DCT coefficient to reconstruct each of the pixel blocks, weighted averaging is performed on pixel values of pixel points corresponding to the position of the target pixel point in each of the reconstructed pixel blocks, and the pixel value obtained after the weighted averaging is taken as the pixel value of the target pixel point, thereby effectively improving the noise reduction effect of the image. Wherein the size of the neighboring window is usually 8×8, and correspondingly, the size of each of the pixel blocks is usually 8×8. The preset threshold is set manually, and the value of the threshold is set according to the noise level of the image. The noise level is determined by ISO, exposure time of the camera and sensor of the camera itself. The higher the value of ISO is, the stronger the photosensitive capacity of the photosensitive element will be. When the DCT coefficient corresponding to each pixel block is updated according to the preset threshold, optionally, the coefficient smaller than the preset threshold among the DCT coefficients is set to be zero.

In step S103, gray scale transformation processing is performed on the normally noise-reduced image to obtain a frame of overexposed image.

In some embodiments of the present disclosure, in the process of performing gray scale transformation processing on the normally noise-reduced image, inverse transformation processing, logarithmic transformation processing or piecewise linear transformation processing is performed on the normally noise-reduced image. Optionally, gamma transformation processing is performed on the normally noise-reduced image to obtain an overexposed image with enhanced contrast and distinguishable details. In some embodiments, the formula of gamma transformation is $s=cr^\gamma$, wherein s represents the overexposed image, r represents the gray scale value of the normally noise-reduced image which ranges from [0, 1], c represents the gray scale scaling coefficient which is used to stretch the image gray scale on the whole. Optionally, the value of c is 1. $\gamma$ represents the gamma coefficient, and optionally, $\gamma$=0.625 so as to improve the enhancement effect for the image.

In step S104, the underexposed image, the normally noise-reduced image and the overexposed image are fused to obtain a frame of super night scene image.

In some embodiments of the present disclosure, the underexposed image can provide rich details for the high light in the image, the normally noise-reduced image can provide rich details for the middle brightness in the image, and the overexposed image can provide details for the dark part of the image. By fusing the underexposed image, the normally noise-reduced image and the overexposed image, a fused super night scene image is obtained, and the super night scene image is an HDR (High Dynamic Range) image. In the operation of fusing the underexposed image, the normally noise-reduced image and the overexposed image, optionally, motion pixel removal is performed on the underexposed image and the overexposed image with reference to the normally exposed image so as to obtain a third image and a fourth image, respectively; down-sampling is performed on the normally exposed image, the third image and the fourth image to calculate a first weight map, three images obtained by the down-sampling are respectively converted into gray scale images, and multi-resolution fusion is performed on the gray scale images to calculate a second weight map. The second weight image is up-sampled to the same size as the original image, and weighted fusion is performed on the normally exposed image, the underexposed image and the overexposed image, thereby improving the visual effect of the HDR image. In some embodiments, other fusion processing methods in the prior art may also be used to fuse the underexposed image, the normally noise-reduced image and the overexposed image, and this will not be further described herein.

In some embodiments of the present disclosure, acquiring consecutive multiple frames of original images, which include a frame of underexposed image and multiple frames of normally exposed images; in response to performing stacked noise reduction processing on the multiple frames of normally exposed images to obtain a frame of normally noise-reduced image; in response to performing gray scale transformation processing on the normally noise-reduced image to obtain a frame of overexposed image; and fusing the underexposed image, the normally noise-reduced image and the overexposed image to obtain a frame of super night scene image. As such, the noise of the night scene images is decreased and the user experience is improved. In the stacked noise reduction processing for the multiple frames of normally exposed images, weighted fusion noise reduction processing is performed on the multiple frames of normally exposed images that are aligned in the YUV space, thereby improving the processing speed for the night scene image, and further improving the user experience.

SECOND EMBODIMENT

Figure 2:
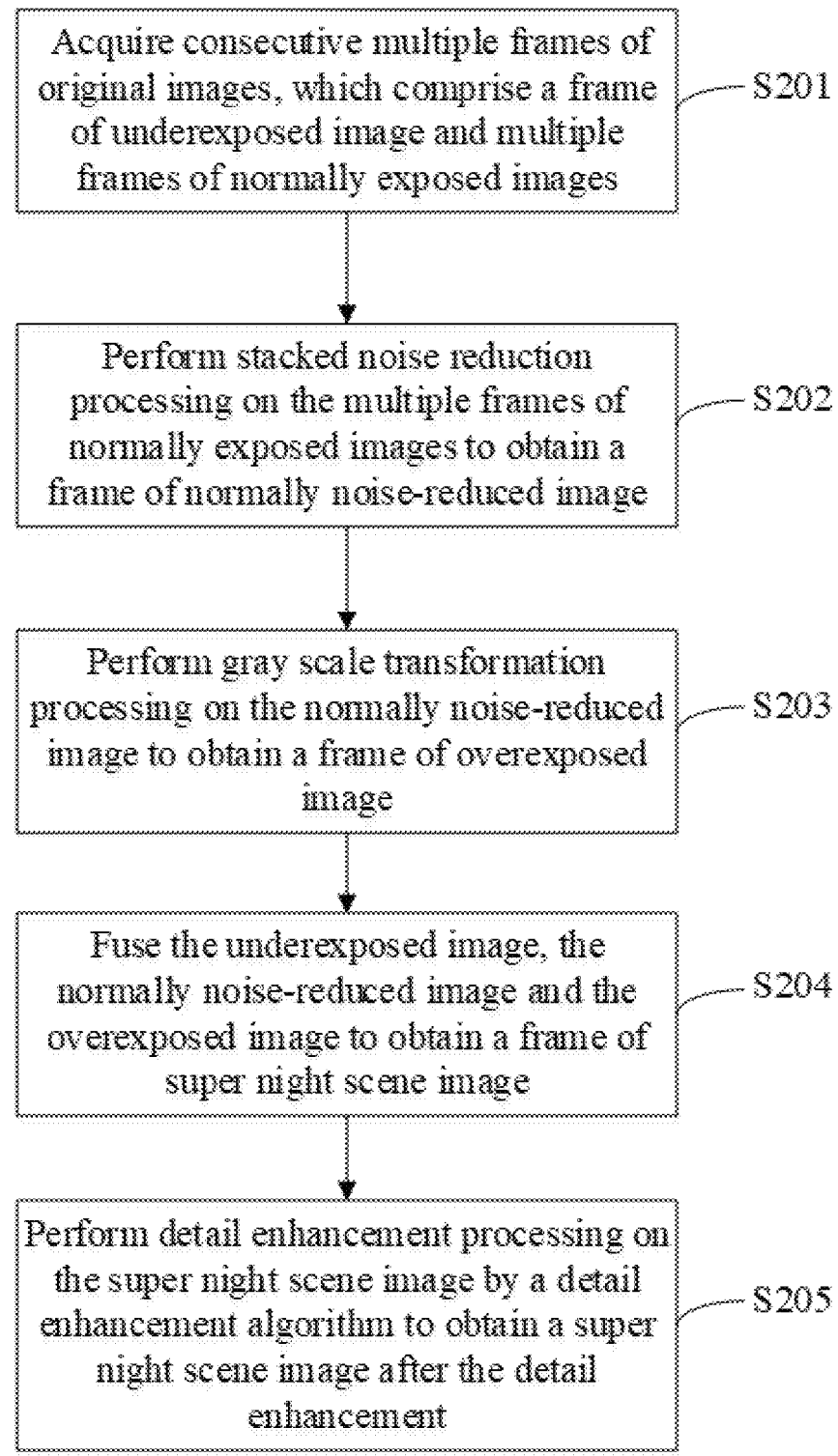
FIG. 2 is a flowchart diagram for implementing a method for generating a super night scene image according to a second embodiment of the present disclosure.

FIG. 2 shows a flowchart diagram for implementing a method for generating a super night scene image according to a second embodiment of the present disclosure. For convenience of description, only parts related to the embodiment of the present disclosure are shown, and the details are as follows.

In step S201, consecutive multiple frames of original images, which include a frame of underexposed image and multiple frames of normally exposed images, are acquired.

In step S202, stacked noise reduction processing is performed on the multiple frames of normally exposed images to obtain a frame of normally noise-reduced image.

In step S203, gray scale transformation processing is performed on the normally noise-reduced image to obtain a frame of overexposed image.

In step S204, the underexposed image, the normally noise-reduced image and the overexposed image are fused to obtain a frame of super night scene image.

In the embodiment of the present disclosure, reference is made to the description of steps S101 to S104 in the first embodiment described above for the implementation of steps S201 to S204, and this will not be further described herein.

In step S205, detail enhancement processing is performed on the super night scene image by a detail enhancement algorithm to obtain a super night scene image after the detail enhancement.

In the embodiment of the present disclosure, detail enhancement processing is performed on the super night scene image by the detail enhancement algorithm to obtain a super night scene image after the detail enhancement, thereby further improving the details of the image and further improving the definition of the image.

Optionally, the detail enhancement algorithm is a detail enhancement algorithm based on edge-preserving filtering, and the super night scene image after the detail enhancement is: $I'(x,y)=k_1 I(x,y)+(1-k_1)S_1(x,y)$, wherein $I'(x,y)$ represents the super night scene image after the detail enhancement, $I(x,y)$ represents the super night scene image, $S_1(x,y)$ represents an image obtained by edge-preserving filtering processing on the super night scene image, represents the coefficient for image detail enhancement, and $k_1>1$. Specifically, edge-preserving filtering processing is performed on the super night scene image $I(x,y)$ to obtain the image $S_1(x,y)$ after edge-preserving filtering processing, and the super night scene image after the detail enhancement can be obtained through the formula $$I'(x,y)=k_1 I(x,y)+(1-k_1)S_1(x,y).$$

Optionally, the detail enhancement algorithm is a detail enhancement algorithm based on ordinary filtering, and the super night scene image after the detail enhancement is: $I'(x,y)=\max(\min(T(x,y),I_d(x,y)),I_e(x,y))$, wherein $T(x,y)=k_2 I(x,y)+(1-k_2)S_2(x,y)$, $I'(x,y)$ represents the super night scene image after the detail enhancement, $I(x,y)$ represents the super night scene image, $S_2(x,y)$ represents an image obtained after performing ordinary filtering processing on the super night scene image, represents an image obtained after performing expansion processing on the super night scene image, $I_e(x,y)$ represents an image obtained after performing corrosion processing on the super night scene image, $k_2$ represents the coefficient for image detail enhancement, and $k_2>1$. Specifically, ordinary filtering processing, expansion processing and corrosion processing are respectively performed on the super night scene image $I(x,y)$ to obtain the image $S_2(x,y)$ after the ordinary filtering processing, the image after the expansion processing, and the image $I_e(x,y)$ after the corrosion processing, and then the super night scene image after the detail enhancement can be obtained according to the formula:

$$T'(x,y)=\max(\min(T(x,y),I_d(x,y)),I_e(x,y))$$

$$T(x,y)=k_2 I(x,y)+(1-k_2)S_2(x,y).$$

In some embodiments of the present disclosure, acquiring consecutive multiple frames of original images, which include a frame of underexposed image and multiple frames of normally exposed images; in response to performing stacked noise reduction processing on the multiple frames of normally exposed images to obtain a frame of normally noise-reduced image; in response to performing gray scale transformation processing on the normally noise-reduced image to obtain a frame of overexposed image; in response to fusing the underexposed image, the normally noise-reduced image and the overexposed image to obtain a frame of super night scene image; and preforming detail enhancement processing on the super night scene image by a detail enhancement algorithm. As such, the details of the night scene images and the user experience are both improved.

THIRD EMBODIMENT

Figure 3:
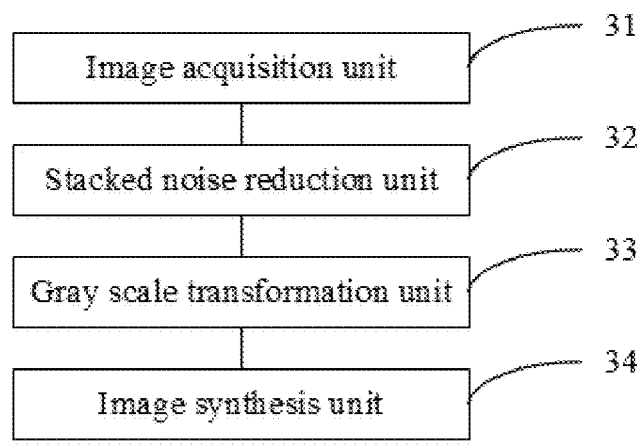
FIG. 3 is a schematic structural diagram of a device for generating a super night scene image according to a third embodiment of the present disclosure.

FIG. 3 shows the structure of a device for generating a super night scene image according to the third embodiment of the present disclosure. For convenience of description, only parts related to the embodiment of the present disclosure are shown, and the device includes:

an image acquisition unit 31, being configured to acquire consecutive multiple frames of original images, which include a frame of underexposed image and multiple frames of normally exposed images;

a stacked noise reduction unit 32, being configured to perform stacked noise reduction processing on the multiple frames of normally exposed images to obtain a frame of normally noise-reduced image;

a gray scale transformation unit 33, being configured to perform gray scale transformation processing on the normally noise-reduced image to obtain a frame of overexposed image; and an image synthesis unit 34, being configured to fuse the underexposed image, the normally noise-reduced image and the overexposed image to obtain a frame of super night scene image.

Optionally, the stacked noise reduction unit includes:

a first noise reduction subunit, being configured to perform weighted fusion noise reduction processing on the multiple frames of normally exposed images to obtain a frame of stacked noise-reduced image;

a second noise reduction subunit, being configured to perform noise reduction processing on the stacked noise-reduced image by a single-frame image noise reduction method to obtain the normally noise-reduced image.

Optionally, the first noise reduction subunit includes:

a reference image selection unit, being configured to select a frame of image from the multiple frames of normally exposed images as a reference image;

an image alignment processing unit, being configured to align the images other than the reference image among the multiple frames of normally exposed images with the reference image;

a third noise reduction subunit, being configured to perform weighted fusion noise reduction processing on the multiple frames of normally exposed images that are aligned according to the first formula to obtain the stacked noise-reduced image. The first formula is:

$$\bar{I}(x,y) = \frac{\sum_{M-1}^{I} w_i(x,y) I_i(x,y)}{\sum_{M-1}^{I} w_i(x,y)},$$

wherein $\bar{I}(x,y)$ represents the stacked noise-reduced image, $I_i(x,y)$ represents the i-th image among the multiple frames of normally exposed images that are aligned, M−1 represents the number of frames of the normally exposed images, $w_i(x,y)$ represents a weight of the weighted fusion, and the weight $w_i(x,y)$ is calculated by the following formula:

$$w_i(x,y) = \begin{cases} 1 & d(x,y) <= n \\ \max\left(\frac{3n-d(x,y)}{2n},0\right) & d(x,y) > n \end{cases},$$

$$d(x,y) = |I_i(x,y) - I_0(x,y)|,$$

wherein $I_0(x,y)$ represents the reference image, and n represents an intensity value of a preset image noise.

Optionally, the second noise reduction subunit includes:
a pixel point selecting unit, being configured to randomly select several reference pixel points in a neighboring window of a target pixel point;
a pixel block acquisition unit, being configured to respectively take the target pixel point and each of the reference pixel points as centers to obtain pixel blocks;
a DCT transform unit, being configured to perform DCT transform on each of the pixel blocks, and update a DCT coefficient corresponding to each of the pixel blocks according to a preset threshold;
an DCT inverse transform unit, being configured to perform DCT inverse transform on the updated DCT coefficient to reconstruct each of the pixel blocks;
a pixel value calculating unit, being configured to perform weighted averaging on pixel values of pixel points corresponding to the position of the target pixel point in each of the reconstructed pixel blocks, and take the pixel value obtained after the weighted averaging as the pixel value of the target pixel point.

Optionally, the DCT transform unit includes:
a DCT transform subunit, being configured to set the coefficient smaller than the preset threshold among the DCT coefficients to be zero.

Optionally, the third noise reduction subunit includes:
a fourth noise reduction subunit, being configured to perform weighted fusion noise reduction processing on the multiple frames of normally exposed images that are aligned in a YUV space according to the first formula.

Optionally, the fourth noise reduction subunit includes:

a component data acquisition unit, being configured to acquire Y component data of the multiple frames of normally exposed images that are aligned, and U component data and V component data of the reference image; or a component data acquisition unit, being configured to perform weighted fusion noise reduction processing on the Y component data and performing edge-preserving filtering processing on the U component data and the V component data according to the first formula;

a component data synthesis unit, being configured to combine the Y component data after the weighted fusion noise reduction processing, and the U component data and the V component data after the edge-preserving filtering processing to obtain the stacked noise-reduced image.

Optionally, the gray scale transformation unit includes:

a gamma transformation unit, being configured to perform gamma transformation processing on the normally noise-reduced image.

Optionally, the gamma coefficient used for gamma transformation processing on the normally noise-reduced image is 0.625.

Optionally, the device further includes:

a detail enhancement processing unit, being configured to perform detail enhancement processing on the super night scene image by a detail enhancement algorithm to obtain a super night scene image after the detail enhancement;

wherein the detail enhancement algorithm is a detail enhancement algorithm based on edge-preserving filtering, and the super night scene image after the detail enhancement is: $I'(x,y)=k_1 I(x,y)+(1-k_1)S_1(x,y)$, wherein $I'(x,y)$ represents the super night scene image after the detail enhancement, $I(x,y)$ represents the super night scene image, $S_1(x,y)$ represents an image obtained by edge-preserving filtering processing on the super night scene image, $k_1$ represents the coefficient for image detail enhancement, and $k_1>1$; or the detail enhancement algorithm is a detail enhancement algorithm based on ordinary filtering, and the super night scene image after the detail enhancement is:

$$I'(x,y)=\max(\min(T(x,y),I_d(x,y)),I_e(x,y)), \text{ wherein}$$

$T(x,y)=k_2 I(x,y)+(1-k_2)S(x,y)$, $I'(x,y)$ represents the super night scene image after the detail enhancement, $I(x,y)$ represents the super night scene image, $S_2(x,y)$ represents an image obtained after performing ordinary filtering processing on the super night scene image, $I_d(x,y)$ represents an image obtained after performing expansion processing on the super night scene image, $I_e(x,y)$ represents an image obtained after performing corrosion processing on the super night scene image, represents the coefficient for image detail enhancement, and $k_2>1$.

In some embodiments of the present disclosure, units of the device for generating the super night scene image is implemented by corresponding hardware or software units, and each of the units is an independent software or hardware unit or integrated into one software or hardware unit, and this is not intended to limit the present disclosure. Reference is made to the description of the embodiments of the method described above for the specific implementation of each of the units of the device for generating the super night scene image, and this will not be further described herein.

FOURTH EMBODIMENT

Figure 4:
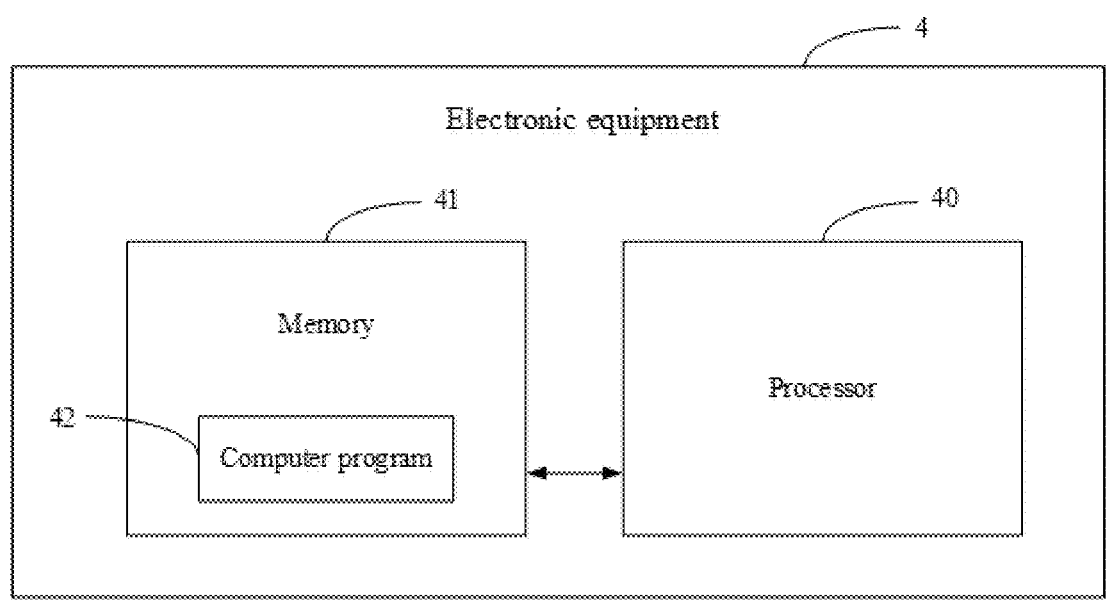
FIG. 4 is a schematic structural diagram of an electronic equipment according to a fourth embodiment of the present disclosure.

FIG. 4 shows the structure of an electronic equipment according to the fourth embodiment of the present disclosure. For convenience of description, only parts related to the embodiment of the present disclosure are shown.

An electronic equipment 4 of the embodiment of the present disclosure includes a processor 40, a memory 41, and a computer program 42 stored in the memory 41 and executable on the processor 40. The computer program 42, when executed by the processor 40, enables the processor 40 to execute the steps of the method for generating a super night scene image according to the embodiments described above, e.g., steps S101 to S104 shown in FIG. 1. Alternatively, the computer program 42, when executed by the processor 40, enables the processor 40 to implement the functions of the units in the embodiments of the device described above, e.g., functions of the units 31 to 34 shown in FIG. 3.

In some embodiments of the present disclosure, acquiring consecutive multiple frames of original images, which include a frame of underexposed image and multiple frames of normally exposed images; in response to performing stacked noise reduction processing on the multiple frames of normally exposed images to obtain a frame of normally noise-reduced image; in response to performing gray scale transformation processing on the normally noise-reduced image to obtain a frame of overexposed image; and fusing the underexposed image, the normally noise-reduced image and the overexposed image to obtain a frame of super night scene image. As such, the noise of the night scene images is decreased and the user experience is improved.

FIFTH EMBODIMENT

In some embodiments of the present disclosure, a computer-readable storage medium is provided, and the computer-readable storage medium stores a computer program which, when executed by a processor, executes the steps of the method for generating a super night scene image according to the embodiments described above, e.g., steps S101 to S104 shown in FIG. 1. Alternatively, the computer program, when executed by the processor, implements the functions of the units of the device according to the embodiments described above, e.g., functions of the units 31 to 34 shown in FIG. 3.

In some embodiments of the present disclosure, acquiring consecutive multiple frames of original images, which include a frame of underexposed image and multiple frames of normally exposed images; in response to performing stacked noise reduction processing on the multiple frames of normally exposed images to obtain a frame of normally noise-reduced image; in response to performing gray scale transformation processing on the normally noise-reduced image to obtain a frame of overexposed image; and fusing the underexposed image, the normally noise-reduced image and the overexposed image to obtain a frame of super night scene image. As such, the noise of the night scene images is decreased and the user experience is improved.

The computer-readable storage medium of the embodiment of the present disclosure include any entity or device, recording medium capable of carrying computer program code, such as an ROM/RAM, a magnetic disk, an optical disk, a flash memory and other memories.

What described above are only preferred embodiments of the present disclosure, and are not intended to limit the present disclosure. Any modifications, equivalent substitutions and improvements made within the spirit and principle of the present disclosure shall be included in the scope claimed in the present disclosure.

What is claimed is:

1. A method for generating a super night scene image, being characterized in that, the method comprising the following steps:

acquiring consecutive multiple frames of original images, which include a frame of underexposed image and multiple frames of normally exposed images;

performing stacked noise reduction processing on the multiple frames of normally exposed images to obtain a frame of normally noise-reduced image;

performing gray scale transformation processing on the normally noise-reduced image to obtain a frame of overexposed image;

fusing the underexposed image, the normally noise-reduced image and the overexposed image to obtain a frame of super night scene image, and performing detail enhancement processing on the super night scene image by a detail enhancement algorithm to obtain a super night scene image after the detail enhancement, wherein the step of performing gray scale transformation processing on the normally noise-reduced image comprises:

performing gamma transformation processing on the normally noise-reduced image.

2. The method according to claim 1, wherein the step of performing stacked noise reduction processing on the multiple frames of normally exposed images to obtain a frame of normally noise-reduced image comprises:

performing weighted fusion noise reduction processing on the multiple frames of normally exposed images to obtain a frame of stacked noise-reduced image;

performing noise reduction processing on the stacked noise-reduced image by a single-frame image noise reduction method to obtain the normally noise-reduced image.

3. The method according to claim 2, wherein the step of performing weighted fusion noise reduction processing on the multiple frames of normally exposed images to obtain a frame of stacked noise-reduced image comprises:

selecting a frame of image from the multiple frames of normally exposed images as a reference image;

aligning the images other than the reference image in the multiple frames of normally exposed images with the reference image;

performing weighted fusion noise reduction processing on the multiple frames of normally exposed images that are aligned according to a first formula to obtain the stacked noise-reduced image;

wherein the first formula is $$\overline{I}(x, y) = \frac{\sum_{M-1}^{I} w_i(x, y) I_i(x, y)}{\sum_{M-1}^{I} w_i(x, y)},$$

$\overline{I}(x,y)$ represents the stacked noise-reduced image, $I_i(x,y)$ represents the i-th image among the multiple frames of normally exposed images that are aligned, $M-1$ represents the number of frames of the normally exposed images, $w_i(x,y)$ represents a weight of the weighted fusion, and the weight $w_i(x,y)$ is calculated by the following formula:

$$w_i(x, y) = \begin{cases} 1 & d(x, y) <= n \\ \max\left(\frac{3n - d(x, y)}{2n}, 0\right) & d(x, y) > n \end{cases},$$

$$d(x, y) = |I_i(x, y) - I_0(x, y)|,$$

wherein $I_0(x,y)$ represents the reference image, and n represents an intensity value of a preset image noise.

4. The method according to claim 3, wherein the step of performing weighted fusion noise reduction processing on the multiple frames of normally exposed images that are aligned according to a first formula comprises:

performing weighted fusion noise reduction processing on the multiple frames of normally exposed images that are aligned in a YUV space according to the first formula.

5. The method according to claim 4, wherein the step of performing weighted fusion noise reduction processing on the multiple frames of normally exposed images that are aligned in a YUV space according to the first formula comprises:

acquiring Y component data of the multiple frames of normally exposed images that are aligned, and U component data and V component data of the reference image;

performing weighted fusion noise reduction processing on the Y component data and performing edge-preserving filtering processing on the U component data and the V component data according to the first formula;

combining the Y component data after the weighted fusion noise reduction processing, and the U component data and the V component data after the edge-preserving filtering processing to obtain the stacked noise-reduced image.

6. The method according to claim 2, wherein the step of performing noise reduction processing on the stacked noise-reduced image by a single-frame image noise reduction method comprises:

randomly selecting several reference pixel points in a neighboring window of a target pixel point;

respectively taking the target pixel point and each of the reference pixel points as centers to obtain pixel blocks;

performing DCT transform on each of the pixel blocks, and updating a DCT coefficient corresponding to each of the pixel blocks according to a preset threshold;

performing DCT inverse transform on the updated DCT coefficient to reconstruct each of the pixel blocks;

performing weighted averaging on pixel values of pixel points corresponding to the position of the target pixel point in each of the reconstructed pixel blocks, and taking the pixel value obtained after the weighted averaging as the pixel value of the target pixel point.

7. The method according to claim 6, wherein the step of updating a DCT coefficient corresponding to each of the pixel blocks according to a preset threshold comprises:

setting the coefficient smaller than the preset threshold among the DCT coefficients to be zero.

8. The method according to claim 1, wherein the gamma coefficient used for gamma transformation processing on the normally noise-reduced image is 0.625.

9. The method according to claim 1, wherein the detail enhancement algorithm is a detail enhancement algorithm based on edge-preserving filtering, and the super night scene image after the detail enhancement is: $I'(x,y)=k_1 I(x,y)+(1-k_1)S_1(x,y)$ wherein $I'(x,y)$ represents the super night scene image after the detail enhancement, I(x,y) represents the super night scene image, S₁(x,y) represents an image obtained after performing edge-preserving filtering processing on the super night scene image, $k_1$ represents the coefficient for image detail enhancement, and $k_1>1$; or the detail enhancement algorithm is a detail enhancement algorithm based on ordinary filtering, and the super night scene image after the detail enhancement is: I'(x,y)=max(min(T(x,y),I_d(x,y)),I_e(x,y)), wherein T(x,y)=k₂I(x,y)+(1−k₂)S₂(x,y) I'(x,y) represents the super night scene image after the detail enhancement, I(x,y) represents the super night scene image, S₂(x,y) represents an image obtained after performing ordinary filtering processing on the super night scene image, I_d(x,y) represents an image obtained after performing expansion processing on the super night scene image, I_e(x,y) represents an image obtained after performing corrosion processing on the super night scene image, $k_2$ represents the coefficient for image detail enhancement, and $k_2>1$.

10. An electronic equipment, comprising:

a processor;

memory in electronic communication with the processor;

one or more computer programs, stored in the memory and configured to be executed by the processor, wherein the computer program, when executed by the processor, enabling the processor to execute a method for generating a super night scene image;

wherein the method for generating a super night scene image comprises:

acquiring consecutive multiple frames of original images, which include a frame of underexposed image and multiple frames of normally exposed images;

performing stacked noise reduction processing on the multiple frames of normally exposed images to obtain a frame of normally noise-reduced image;

performing gray scale transformation processing on the normally noise-reduced image to obtain a frame of overexposed image;

fusing the underexposed image, the normally noise-reduced image and the overexposed image to obtain a frame of super night scene image, and performing detail enhancement processing on the super night scene image by a detail enhancement algorithm to obtain a super night scene image after the detail enhancement, wherein the step of performing gray scale transformation processing on the normally noise-reduced image comprises:

performing gamma transformation processing on the normally noise-reduced image.

11. The electronic equipment according to claim 10, wherein the step of performing stacked noise reduction processing on the multiple frames of normally exposed images to obtain a frame of normally noise-reduced image comprises:

performing weighted fusion noise reduction processing on the multiple frames of normally exposed images to obtain a frame of stacked noise-reduced image;

performing noise reduction processing on the stacked noise-reduced image by a single-frame image noise reduction method to obtain the normally noise-reduced image.

12. The electronic equipment according to claim 11, wherein the step of performing weighted fusion noise reduction processing on the multiple frames of normally exposed images that are aligned in a YUV space according to the first formula comprises:

acquiring Y component data of the multiple frames of normally exposed images that are aligned, and U component data and V component data of the reference image;

performing weighted fusion noise reduction processing on the Y component data and performing edge-preserving filtering processing on the U component data and the V component data according to the first formula;

combining the Y component data after the weighted fusion noise reduction processing, and the U component data and the V component data after the edge-preserving filtering processing to obtain the stacked noise-reduced image.

13. The electronic equipment according to claim 10, wherein the step of performing weighted fusion noise reduction processing on the multiple frames of normally exposed images to obtain a frame of stacked noise-reduced image comprises:

selecting a frame of image from the multiple frames of normally exposed images as a reference image;

aligning the images other than the reference image in the multiple frames of normally exposed images with the reference image;

performing weighted fusion noise reduction processing on the multiple frames of normally exposed images that are aligned according to a first formula to obtain the stacked noise-reduced image;

wherein the first formula is $$\bar{I}(x,y) = \frac{\sum_{M-1}^{I} w_i(x,y) I_i(x,y)}{\sum_{M-1}^{I} w_i(x,y)},$$

$\bar{I}(x,y)$ represents the stacked noise-reduced image, $I_i(x,y)$ represents the i-th image among the multiple frames of normally exposed images that are aligned, M−1 represents the number of frames of the normally exposed images, $w_i(x,y)$ represents a weight of the weighted fusion, and the weight $w_i(x,y)$ is calculated by the following formula:

$$w_i(x,y) = \begin{cases} 1 & d(x,y) <= n \\ \max\left(\frac{3n-d(x,y)}{2n}, 0\right) & d(x,y) > n \end{cases},$$

$$d(x,y) = |I_i(x,y) - I_0(x,y)|,$$

wherein $I_0(x,y)$ represents the reference image, and n represents an intensity value of a preset image noise.

14. The electronic equipment according to claim 10, wherein the step of performing weighted fusion noise reduction processing on the multiple frames of normally exposed images that are aligned according to a first formula comprises:

performing weighted fusion noise reduction processing on the multiple frames of normally exposed images that are aligned in a YUV space according to the first formula.

15. The electronic equipment according to claim 14, wherein the step of updating a DCT coefficient corresponding to each of the pixel blocks according to a preset threshold comprises:

setting the coefficient smaller than the preset threshold among the DCT coefficients to be zero.

16. The electronic equipment according to claim 10, wherein the step of performing noise reduction processing on the stacked noise-reduced image by a single-frame image noise reduction method comprises:
   randomly selecting several reference pixel points in a neighboring window of a target pixel point;
   respectively taking the target pixel point and each of the reference pixel points as centers to obtain pixel blocks;
   performing DCT transform on each of the pixel blocks, and updating a DCT coefficient corresponding to each of the pixel blocks according to a preset threshold;
   performing DCT inverse transform on the updated DCT coefficient to reconstruct each of the pixel blocks;
   performing weighted averaging on pixel values of pixel points corresponding to the position of the target pixel point in each of the reconstructed pixel blocks, and taking the pixel value obtained after the weighted averaging as the pixel value of the target pixel point.

17. The electronic equipment according to claim 10, wherein the detail enhancement algorithm is a detail enhancement algorithm based on edge-preserving filtering, and the super night scene image after the detail enhancement is: $I'(x,y)=k_1 I(x,y)+(1-k_1)S_1(x,y)$, wherein $I'(x,y)$ represents the super night scene image after the detail enhancement, $I(x,y)$ represents the super night scene image, $S_1(x,y)$ represents an image obtained after performing edge-preserving filtering processing on the super night scene image, $k_1$ represents the coefficient for image detail enhancement, and $k_1>1$; or
   the detail enhancement algorithm is a detail enhancement algorithm based on ordinary filtering, and the super night scene image after the detail enhancement is: $I'(x,y)=\max(\min(T(x,y),I_d(x,y)),I_e(x,y))$, wherein $T(x,y)=k_2 I(x,y)+(1-k_2)S_2(x,y)$, $I'(x,y)$ represents the super night scene image after the detail enhancement, $I(x,y)$ represents the super night scene image, $S_2(x,y)$ represents an image obtained after performing ordinary filtering processing on the super night scene image, $I_d(x,y)$ represents an image obtained after performing expansion processing on the super night scene image, $I_e(x,y)$ represents an image obtained after performing corrosion processing on the super night scene image, $k_2$ represents the coefficient for image detail enhancement, and $k_2>1$.

18. A non-transitory computer-readable storage medium storing a computer program, wherein the computer program, when being executed by a processor, executes a method for generating a super night scene image;
   wherein the method for generating a super night scene image comprises:
   acquiring consecutive multiple frames of original images, which include a frame of underexposed image and multiple frames of normally exposed images;
   performing stacked noise reduction processing on the multiple frames of normally exposed images to obtain a frame of normally noise-reduced image;
   performing gray scale transformation processing on the normally noise-reduced image to obtain a frame of overexposed image;
   fusing the underexposed image, the normally noise-reduced image and the overexposed image to obtain a frame of super night scene image, and
   performing detail enhancement processing on the super night scene image by a detail enhancement algorithm to obtain a super night scene image after the detail enhancement,
   wherein the step of performing gray scale transformation processing on the normally noise-reduced image comprises:
   performing gamma transformation processing on the normally noise-reduced image.

\* \* \* \* \*